(12) United States Patent
Stocks et al.

(10) Patent No.: US 12,107,925 B2
(45) Date of Patent: Oct. 1, 2024

(54) DATA PROCESSING TRANSACTIONS BETWEEN DISPARATE SYSTEMS USING A UNIVERSAL PROCESSOR

(71) Applicant: Bank of America Corporation, Charlotte, NC (US)

(72) Inventors: Dustin Paul Stocks, Matthews, NC (US); Jinna Zevulun Kim, Charlotte, NC (US); Robert Nyeland Huggins, Charlotte, NC (US); Pratap Dande, Saint Johns, FL (US); George Anthony Albero, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 192 days.

(21) Appl. No.: 17/352,094

(22) Filed: Jun. 18, 2021

(65) Prior Publication Data

US 2022/0407921 A1 Dec. 22, 2022

(51) Int. Cl.
| | | |
|---|---|---|
| *H04L 67/141* | (2022.01) | |
| *G06K 7/14* | (2006.01) | |
| *H04L 67/146* | (2022.01) | |

(52) U.S. Cl.
CPC .......... *H04L 67/141* (2013.01); *G06K 7/1417* (2013.01); *H04L 67/146* (2013.01)

(58) Field of Classification Search
CPC ... G06K 7/1417; H04L 67/141; H04L 67/146; H04L 63/0807; H04L 63/10
See application file for complete search history.

(56) References Cited

U.S. PATENT DOCUMENTS

| | | |
|---|---|---|
| 7,426,492 B1 | 9/2008 | Bishop et al. |
| 8,387,873 B2 | 3/2013 | Saunders et al. |
| 8,452,708 B1 | 5/2013 | Birenbaum et al. |
| 8,467,767 B2 | 6/2013 | Sun et al. |
| 8,504,470 B1 | 8/2013 | Chirehdast |
| 8,635,157 B2 | 1/2014 | Smith et al. |
| 8,712,914 B2 | 4/2014 | Lyons et al. |
| 8,719,158 B2 | 5/2014 | Todd |
| 8,751,347 B2 | 6/2014 | Mullen et al. |

(Continued)

FOREIGN PATENT DOCUMENTS

| | | |
|---|---|---|
| AU | 2009322877 B2 | 11/2012 |
| AU | 2017200988 B2 | 9/2018 |

(Continued)

*Primary Examiner* — Jason D Recek

(57) ABSTRACT

A system is provided including a host processor, a plurality of service processors, a universal processor associated with the host processor and capable of exchanging data with each service processor, a first user device of the first user and a second user device of a second user. The universal processor receives a request from the first user device for a data transaction between the host processor and a service processor, and in response generates a code that can be interpreted by the service processor. Universal processor transmits the code to the first user device, which transmits the code to the second user device. The second user device transmits the code to the service processor. The service processor decodes the code and requests the universal processor to perform the data transaction with the host processor. In response, the universal processor sets up the data transaction.

17 Claims, 3 Drawing Sheets

(56) References Cited

U.S. PATENT DOCUMENTS

| | | |
|---|---|---|
| 8,781,960 B2 | 7/2014 | Marshall |
| 8,924,294 B2 | 12/2014 | Lynch et al. |
| 8,972,297 B2 | 3/2015 | Kay et al. |
| 9,082,267 B2 | 7/2015 | Rosenberg |
| 9,292,870 B2 | 3/2016 | Langley et al. |
| 9,530,125 B2 | 12/2016 | Bacastow |
| 9,805,362 B2 | 10/2017 | Kobylkin et al. |
| 10,102,514 B2 | 10/2018 | Laracey |
| 10,275,760 B2 | 4/2019 | Marcus |
| 10,332,110 B2 | 6/2019 | Patel et al. |
| 10,628,823 B2 | 4/2020 | Laracey |
| 10,692,063 B2 | 6/2020 | Fisher |
| 10,740,764 B2 | 8/2020 | Suzuki et al. |
| 10,740,829 B2 | 8/2020 | Parikh |
| 10,755,349 B1 | 8/2020 | Boates et al. |
| 10,762,481 B2 | 9/2020 | Haldenby et al. |
| 10,937,023 B2 | 3/2021 | Kote |
| 10,949,840 B2 | 3/2021 | Wankmueller |
| 10,956,893 B2 | 3/2021 | Carlson et al. |
| 11,068,890 B2 * | 7/2021 | Bacastow .......... G06Q 20/4012 |
| 2013/0238503 A1 * | 9/2013 | Patel ................. G06Q 20/3274 705/44 |
| 2015/0220898 A1 * | 8/2015 | Priebatsch ............ G06Q 20/20 705/16 |
| 2016/0055483 A1 * | 2/2016 | Liberty .............. G06Q 20/3674 705/41 |
| 2017/0116596 A1 | 4/2017 | Tsui et al. |
| 2017/0330168 A1 | 11/2017 | Park et al. |
| 2018/0053167 A1 | 2/2018 | Royyuru |
| 2018/0341949 A1 | 11/2018 | Kumnick et al. |
| 2019/0332746 A1 | 10/2019 | Thomas |
| 2021/0012315 A1 | 1/2021 | Priebatsch |
| 2021/0209582 A1 * | 7/2021 | Paliwal .................. G06F 21/31 |
| 2022/0131845 A1 * | 4/2022 | Gaddam ............... G06Q 20/24 |
| 2022/0351156 A1 * | 11/2022 | Ghorbani ............... G06Q 20/02 |

FOREIGN PATENT DOCUMENTS

| | | |
|---|---|---|
| AU | 2013245480 B2 | 1/2019 |
| CA | 2819936 C | 12/2020 |
| EP | 2372628 A2 | 10/2011 |
| EP | 3232386 B1 | 11/2018 |
| EP | 2788938 B1 | 5/2019 |
| KR | 101517515 B1 | 5/2015 |

\* cited by examiner

DATA PROCESSING TRANSACTIONS BETWEEN DISPARATE SYSTEMS USING A UNIVERSAL PROCESSOR

TECHNICAL FIELD

The present disclosure relates generally to data processing, and more specifically to data processing transactions between disparate systems using a universal processor.

BACKGROUND

A conventional data processing service typically allow users that are registered with the service to perform one or more data transactions using the service including data transfer between users registered with the service. An example of such a data processing service includes a cloud data service that allows users registered with the cloud service to store data on cloud servers and perform several data transactions using the data stored on the cloud servers. Additionally, the cloud servers of the cloud data service often allow users registered with the cloud service to exchange data between user accounts. However, one challenge that exists with conventional data processing services is that a user registered with a first data processing service cannot perform data transactions or exchange data with a second data processing service without also registering with the second data processing service. Thus, a user desiring to perform data transactions using multiple data processing services must separately register with each of the multiple data processing services. This typically results in significant user burden associated with separately registering with several data processing services and further monitoring and maintaining several independent user accounts. Another challenge associated with maintaining multiple user accounts is device and network security. For example, data services provided by each data processing service can typically be accessed using a dedicated software application designed for and provided by the service. This means, for example, accessing data services on a smart phone requires the user to install and maintain a smartphone application for each of the data processing services the user is registered with. Each of the smartphone applications is a potential entry point for network intruders and any one compromised application can leave the smartphone and/or an entire network to which the smartphone is connected to vulnerable.

SUMMARY

The system and methods implemented by the system as disclosed in the present disclosure provide technical solutions to the technical problems discussed above by allowing users of two different data processing services to exchange data across the data servers of the data processing services without the users needing to register with both services. The disclosed system and methods provide several practical applications and technical advantages. For example, the disclosed system provides the practical application of allowing a first user having a host account at a host processor to perform a data transaction with a service account of a second user at a service processor without the first user needing to also register with the service processor or the second user needing to also register with the host processor. As described in the following disclosure, a universal processor may be used to bridge data transactions between the host processor and the service processor. The universal processor may be associated with the host processor such that the universal processor can perform data transactions on behalf of the host processor. Further, the universal processor may have a pre-authorized secure connection with the service processor that allows seamless data transfer between the service processor and the universal processor. The universal processor may implement data exchange between the host processor and the service processor using the pre-authorized secure connection between the service processor and the universal processor.

The disclosed system and methods provides an additional practical application of allowing the first user having the host account at the host processor to perform a data transaction with any one of a plurality of service processors the first user is not registered with, using a single software application installed at a user device of the first user. By not having to install multiple software applications at the user device to transact with multiple service providers, the disclosed system improves device security and network security of the network the user device may be connected to by reducing potential entry points for network intruders.

The disclosed system and methods provide an additional practical application of improving device processing performance of the universal processor and each of the service processors, as well as the network performance of the underlying network connecting the universal processor with each service processor. For example, the universal processor communicates with each service processor using a pre-authorized secure connection between the universal processor and the service processor. Using a pre-authorized connection saves the universal processor and each service processor valuable processing resources that would otherwise need to be expended in attempting to setup a new connection every time data is to be exchanged between the universal processor and the service processor. This reduces processing burden on the universal processor as well as each service processor. Using pre-authorized secure connections further saves network bandwidth that would otherwise be used to exchange signaling as part of setting up a new connection every time the universal processor is to exchange data with a service processor. The reduced processing burden and saving of network bandwidth improves performance of the universal processor and each service processor, and of the underlying network connecting the universal processor with each service processors.

In one or more embodiments, a system includes a host processor registering a first user, a plurality of service processors and a universal processor associated with the host processor and capable of exchanging data with each of the service processors, wherein the universal processor bridges data transactions between the host processor and each of the service processors. The system further includes a first user device of the first user communicatively coupled to the universal processor and a second user device of a second user communicatively coupled to at least one service processor of the plurality of service processors, wherein the second user is registered with the at least one service processor. The universal processor is configured to receive from the first user device a request for performing a data transaction between the host processor and the at least one service processor; generate a code that can be interpreted by the at least one service processor, wherein the code is generated according to at least one rule set by the at least one service processor; and transmit the code to the first user device. The first user device is configured to transmit the code to the second user device. The second user device is configured to transmit the code to the at least one service processor. The at least one service processor is configured to receive the code from the second user device; decode the code to extract information included in the code; transmit to the universal processor a request to perform the data transaction with the host processor based on the extracted information; and perform the data transaction with the host processor using the universal processor. The universal processor is further configured to receive the request from the at least one service processor and in response, set up the data transaction between the host processor and the at least one service processor.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
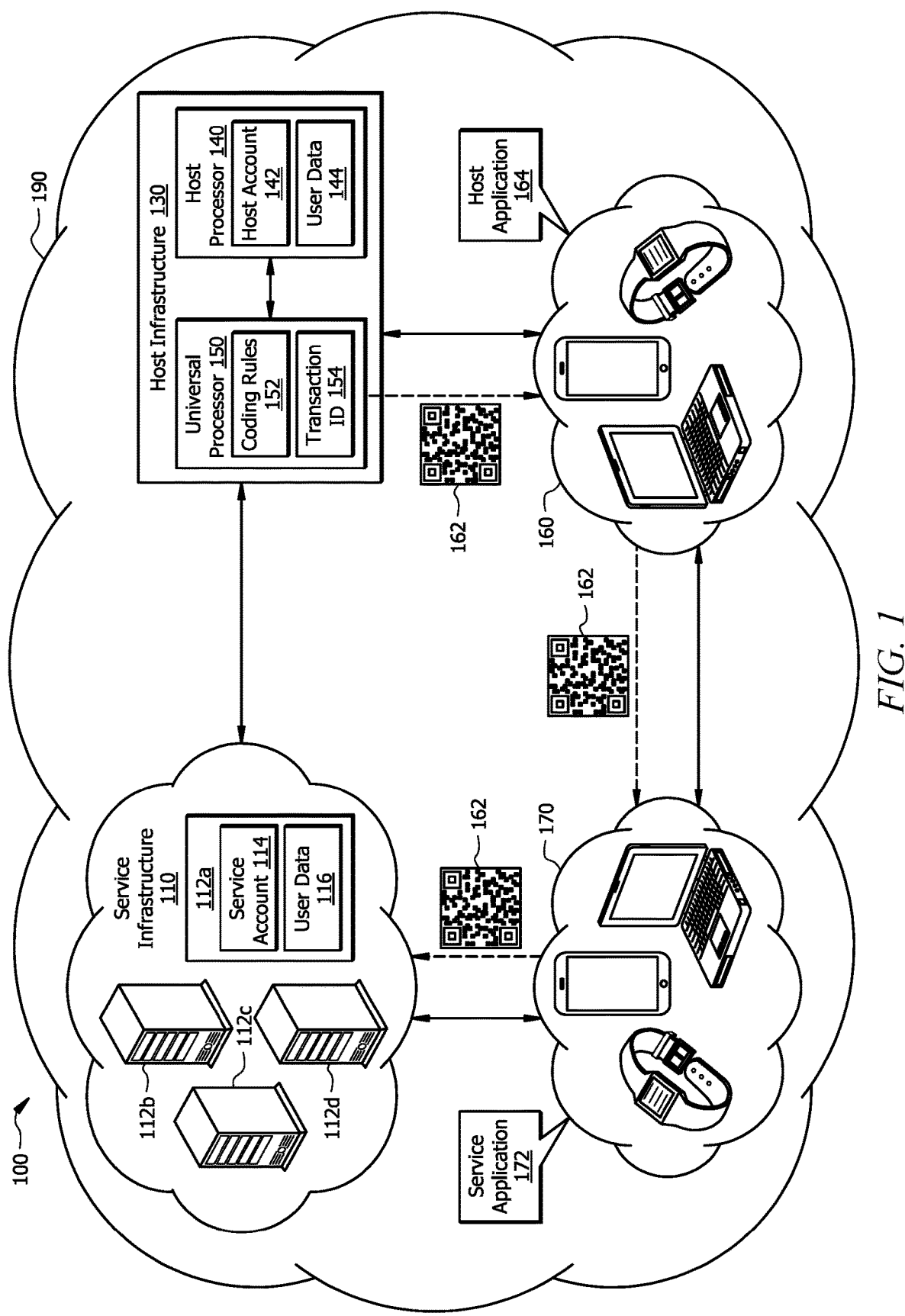
FIG. 1 is a schematic diagram of an example data processing system, in accordance with certain embodiments of the present disclosure.

FIG. 1 is a schematic diagram of an example data processing system 100, in accordance with certain embodiments of the present disclosure.

As shown in FIG. 1, data processing system 100 may include a host infrastructure 130, a service infrastructure 110, a first user device 160 and a second user device 170, each connected to a network 190. The network 190, in general, may be a wide area network (WAN), a personal area network (PAN), a cellular network, or any other technology that allows devices to communicate electronically with other devices. In one or more embodiments, the network 190 may be the Internet.

Host infrastructure 130 may further include a host processor 140 and a universal processor 150 associated with the host processor 140. Host infrastructure 130 may be configured to provide one or more data processing services to users registered with the host infrastructure 130. For example, a first user may have a host account 142 with the host processor 140 which allows the first user to use certain data processing services provided by the host processor 140 using a first user device 160 of the first user such as a wearable computing device (e.g., a smart watch), a portable computing device (e.g., smartphone, tablet computer etc.), a laptop computer, a desktop computer or the like. Host account 142 of the first user may be associated with user data 144 of the first user. User data 144 may include, but is not limited to, personal information related to the user (e.g., user name, social security number), user identification data including ID card number, driving license number, user biometrics data (e.g., fingerprints, face recognition pattern etc.), and information related to the host account 142 including account number and level of access. User data 144 may further include any other information or data maintained for the first user or by the first user at the host processor 140.

In one example use case, host infrastructure 130 may be implemented by a cloud data service provider where host processor 140 stores user data 144 of the first user and provides access to the first user to the stored user data 144 and to one or one or data transactions that can be performed using user data 144. The first user may have a host account 142 with the cloud data service provider that allows the first user to store and access user data 144 of the first user at the host processor 140 and to perform the data transactions based on the user data 144.

Service infrastructure 110 may include a plurality of service processors (shown as 112a-112d). Each of the service processors 112a-112d may be configured to provide one or more data processing services to users registered with the service processor. For example, a second user may have a service account 114 with a service processor (e.g., 112a) which allows the second user to use certain data processing services provided by the service processor 112a using a second user device 170 of the second user such as a wearable computing device (e.g., a smart watch), a portable computing device (e.g., smartphone, tablet computer etc.), a laptop computer, a desktop computer or the like. Service account 114 of the second user may be associated with user data 116 of the second user. User data 116 may include, but is not limited to, personal information related to the user (e.g., user name, social security number), user identification data including ID card number, driving license number, user biometrics data (e.g., fingerprints, face recognition pattern etc.), and information related to the service account 114 including account number and level of access. User data 116 may further include any other information or data maintained for the second user or by the second user at the service processor 112a.

The data processing services provided by the host processor 140 and the service processors 112a-112d may include, but are not limited to, data cloud storage services, software hosting services, media streaming services and banking services.

Each of the host infrastructure 130 and the service processors 112a-112d may be owned and implemented by an enterprise including, but not limited to, a software hosting service provider, a media streaming service provider, a cloud services provider, a retail corporation, a banking corporation or a payment service provider.

Each of the service processors 112a-112d may be implemented by a different data service provider such that a user can use data processing services provided by each service processor (e.g., 112a) if the user is registered with the respective service processor. Thus, a user registered with a first service processor (e.g., 112a) implemented by a first service provider cannot perform data transactions using a second service processor (e.g., 112b) implemented by a second service provider without also registering with the second service processor 112b. Thus, a user desiring to perform data transactions using multiple ones of the service processors 112a-112d must separately register with each of the service processors 112a-112d. This means that the first user registered with the host processor 140 cannot perform data transactions with a service processor 112a without also registering with the service processor 112a. For example, a data transaction (e.g., data transfer) cannot be performed between the host account 142 of the first user at the host processor 140 and the service account 114 of the second user at the service processor 112a without the first user registering with the service processor 112a.

Universal processor 150 of the host infrastructure 130 may be configured to bridge data transactions between the host processor 140 and each of the service processors 112a-112d of the service infrastructure 110. In one or more embodiments, universal processor 150 may be associated with the host processor such that universal processor 150 has access to host account 142, user data 144 and data processing services provided by the host processor 140. For example, universal processor 150 may be authorized by the host processor 140 to access host account 142 and corresponding user data 144, and further to perform data transactions on behalf of the host processor 140 with each of the service processors 112a-112d.

While universal processor 150 is illustrated as a separate entity from the host processor 140, it may be noted that universal processor 150 and host processor 140 may be implemented as a single processing entity. In one embodiment, the functionality of the universal processor 150 as discussed herein may be implemented by a software application that may be designed as a plug-in for a host application implementing the functionality of the host processor 140. Further, while the universal processor 150 is shown as part of the host infrastructure 130, it may be noted that the universal processor 150 may be an independent processing entity outside the host infrastructure 130 and connected to network 190.

Universal processor 150 may be configured to establish a pre-authorized secure connection with each of the service processors 112a-112d that allows the universal processor 150 to access data processing services provided by the service processors 112a-112 d. For example, universal processor 150 may be preauthorized by service processor 112a to access service account 114, user data 116 and perform data transactions with the service processor 112a. Owing to the association with the host processor 140 and pre-authorized connections with service processors 112a-112d, universal processor 150 can freely perform data transactions between the host processor 140 and each service processor (e.g., 112a) without users of the host processor 140 needing to register with the service processor 112a. For example, universal processor 150 may perform a data transfer between the host account 142 of the first user at the host processor 140 and the service account 114 of the second user at the service processor 112a without the first user registering with the service processor 112a.

In one or more embodiments, during a pre-authorization phase, the universal processor 150 attempts to establish secure connections with each of the service processors 112a-112d in order to determine whether a secure connection can be established with the service processors 112a-112d. A secure connection may be established between the universal processor 150 and a service processor 112a by exchanging signaling between them. For example, during an initial attempt to communicate with each other, universal processor 150 and service processor 112a may exchange security credentials (e.g., security certificates) to verify identities of the processors. The universal processor 150 and the service processor 112a can further check whether data can be reliably exchanged between them. The universal processor 150 and service processor 112a pre-authorize each other when a secure and stable connection can be established between the universal processor 150 and the service processor 112a. The pre-authorization of connections between the universal processor 150 and the service processors 112a-112d allows data exchange to occur seamlessly between the universal processor 150 and each of service processors 112a-112d when a data transaction is being processed between host processor 140 and the service processor 112a. For example, since a pre-authorized secure connection was already established between the universal processor 150 and a service processor 112a during the pre-authorization phase, the processors can skip the initial phase of connection establishment and start exchanging data without delay, thus saving processing resources, network bandwidth and time.

In another example, a connection between the universal processor 150 and a service processor 112a may be pre-authorized (e.g., by universal processor 150, service processor 112a or both) when the universal processor 150 uses one or more communication protocols and/or data processing rules approved by the service processor 112a. Using approved communication protocols and/or data processing rules may allow data transactions (e.g., data transfer) to occur seamlessly between the universal processor 150 and the service processor 112a.

In another example, a connection between the universal processor 150 and a service processor 112a may be pre-authorized (e.g., by universal processor 150, service processor 112a or both) when the universal processor 150 and/or service processor 112a satisfy a minimum threshold security standard. For example, universal processor 150 may pre-authorize a connection with service processor 112a, when the service processor 112a implements one or more security measures approved by the universal processor 150. The approved one or more security measures may include, but are not limited to, anti-virus software, anti-spyware software, firewalls to block unauthorized access to the service processor 112a, intrusion prevention systems, virtual private networks to provide safe and secure remote access to the service processor 112a and other measures to restrict physical access to service processor 112a. By setting a threshold security standard for communicating with a universal processor 150 and authorizing those service processors 112a-112d that satisfy the threshold security standard, universal processor 150 may save the host processor 140 from malicious network attacks and help maintain a high degree of data security.

In one or more embodiments, each of the host processor 140, universal processor 150, service processors 112a-112d, first user device 160 and second user device 170 may be implemented by a computing device running one or more software applications. For example, one or more of the host processor 140, universal processor 150, service processors 112a-112d, first user device 160 and second user device 170 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the host processor 140, universal processor 150, service processors 112a-112d, first user device 160 and second user device 170 may be representative of a server running one or more software applications to implement respective functionality as described below. In certain embodiments, one or more of the host processor 140, universal processor 150, service processors 112a-112d, first user device 160 and second user device 170 may run a thin client software application where the processing is directed by the thin client but largely performed by a central entity such as a server (not shown).

Each of the first user device 160 and second user device 170 may be configured to facilitate and manage data processing transactions with host processor 140, universal processor 150 and service processors 112a-112d, as described below. Each of the first user device 160 and second user device 170 may include any device having a communication interface that can be used to communicate with other devices including the universal processor 150, host processor 140, each of the service processor 112a-112d and with each other. Each user first user device 160 and second user device 170 may additionally include a user interface including for example, a display and a user input means (e.g., keypad, touch screen etc.), to allow user interaction with the user device. For example, each of the first user device 160 and second user device 170 may include, but is not limited to, one or more of a wearable computing device (e.g., a smart watch), a portable computing device (e.g., smartphone, tablet computer etc.), a laptop computer, a desktop computer and the like. First user device 160 and second user device 170 may communicate with each of the universal processor 150, host processor 140, each of the service processor 112a-112d and with each other over the network 190 using any known wired or wireless technology.

First user device 160 may be registered as an authorized device with the host infrastructure 130. This allows first user device 160 to perform one or more data transactions with universal processor 150 and/or host processor 140. Similarly, second user device 170 may be registered as an authorized device with at least one of the service processors (e.g., 112a) allowing second user device 170 to perform one or more data transactions with the at least one service processor 112a. In one or more embodiments, a service application 172 may be installed and run on the second user device 170 that allows the second user to manage data transactions with the at least one service processor 112a. For example, when the second user device 170 is a smart phone, the service application 172 may include a mobile software application installed on the smart phone. In one embodiment, the service application 172 may be a dedicated application designed for managing data transactions with a single service processor 112a implemented by a single service provider. This means when the second user desires to perform data transactions with multiple service processors 112a-112d, the second user may need to install separate dedicated service applications 172 for each of the multiple service processors 112a-112d. As described above, the second user may need to separately register with each of the service processors 112a-112d to access data services provided by each service processor. In one embodiment, second user device 170 may be linked to a specific service account 114 at a service processor 112a and can perform data transaction related to the service account 114.

Similarly, a host application 142 may be installed and run on first user device 160 that allows the first user to manage data transactions with the universal processor 150 and/or host processor 140. For example, when the first user device 160 is a smart phone, the host application 142 may include a mobile software application installed on the smart phone. In one embodiment, first user device 160 may be linked to a specific host account 142 at the host processor 140 and can perform data transactions related to the host account 142.

Universal processor 150 may be configured to generate code patterns 162 to bridge data transactions between the host processor 140 and service processors 112a-112d. Universal processor 150 may be configured to generate a separate code pattern 162 for each of the service processors 112a-112d to bridge data transactions between the host processor 140 and the service processor. Each service processor 112a may define coding rules 152 for use by the universal processor 150 to generate code patterns 162 for the service processor 112a. In one embodiment, each of the service processors 112a-112d may define a different set of coding rules 152 and the universal processor 150 is configured to generate code patterns 162 for a service processor 112a based on the set of coding rules 152 defined for the specific service processor 112a. For example, universal processor 150 may be configured to generate a first code pattern 162 for a first service processor 112a based on coding rules 152 defined for the first service processor 112a and generate a second code pattern 162 (e.g., different from the first code pattern) for a second service processor 112b based on coding rules 152 defined for the second service processor 112b. Generating a code pattern 162 based on coding rules 152 defined by a service processor 112a allows the service processor 112a to decode and interpret the code pattern 162. In one embodiment, universal processor 150 may request and receive coding rules from each service processor 112a during the initial connection establishment phase with the service processor 112a as described above. A code pattern 162 generated by the universal processor 150 may include, but is not limited to, a Quick Response (QR) code, a bar code, numbers, letters, alphanumeric characters, special characters or combinations thereof.

Universal processor 150 may include information in the code pattern 162 that may be needed by a service processor 112a to conduct a data transaction with the host processor 140 using the universal processor 150. For example, information included in the code pattern 162 may include, but is not limited to, account details relating to the host account (e.g., account number, user details such as name, social security number etc.), a transaction identifier (ID) 154 of a data transaction for which the code pattern was generated, unique identity such as network address of the universal processor and an authorization for conducting the data transaction with the host account 142 at the host processor 140.

First user device 160 may be configured to initiate data transactions between the host processor 140 and each of the service processors 112a-112d. For example, first user device 160 may be configured to request a data transaction between the host account 142 of the first user at the host processor 140 and the service account 114 of the second user at the service processor 112a. The first user may initiate the request for the data transaction using the host application 164 installed on the first user device 160. In one embodiment, the host application 164 may present a choice of performing the data transaction using multiple service processors 112a-112d. The first user may select any one of the service processors 112a-112d to perform the data transaction with the host processor 140. The first user may further specify a nature of the data transaction and other details related to the data transaction using the host application 164. For example, the data transaction may include a transfer of user data 144 related to the host account 142 to the service account 114 or a transfer of user data 116 related to the service account 114 to the host account 142. In this case, the first user may specify details relating to the user data 144 or user data 116 (whichever the case may be) for the data transfer. In response to receiving a selection of a service processor 112a via the host application 164, first user device 160 may generate and transmit a request to the universal processor 150 for the data transaction between host account 142 at the host processor 140 and service account 114 at the service processor 112a. The request may include the details of the data transaction as specified by the user. For example, the details of the data transaction included in the request may include a request for transfer of user data 144 from the host account 142 to service account 114 or transfer of user data 116 from the service account 114 to host account 142. The request may include an identity of the service processor 112a selected by the user for the data transaction.

In response to receiving the request for the data transaction from first user device 160, universal processor 150 may be configured to generate a code pattern 162 for the data transaction in accordance with coding rules 152 defined for the service processor 112a that was selected for the data transaction. The universal processor 150 may extract the identity of the service processor 112a from the request and select the coding rules 152 corresponding to the service processor 112a for generation of the code pattern 162. Generating the code pattern 162 according to coding rules 152 defined for the service processor 112a allows the service processor 112a to decode and interpret the code pattern 162. Universal processor 150 may include information in the code pattern 162 that may be needed by the service processor 112a to conduct the requested data transaction with the host processor 140 using the universal processor 150. For example, information included in the code pattern 162 may include, but is not limited to, account details relating to the host account 142 (e.g., account number, user details of the first user such as name, social security number etc.), a transaction identifier (ID) 154 for the requested data transaction, a network address of the universal processor 150 and an authorization for conducting the data transaction with the host account 142 at the host processor 140. Universal processor 150 may be configured to assign a unique transaction ID 154 to every data transaction conducted using the universal processor 150. The transaction ID 154 may be associated with information relating to the data transaction. For example, universal processor 150 may generate a unique transaction ID 154 for the data transaction requested by the first user device 160 and map the transaction ID 154 to information relating to the data transaction including one or more of the type of transaction (e.g., data transfer), host account details (e.g., host account number) and user data 144 that is requested for a data transfer to the service processor 112a. The network address of the universal processor 150 may include an Internet Protocol (IP) address, Media Access Control (MAC) address or any other address that uniquely identifies the universal processor within the network 190 and allows other devices connected to the network 190 to find the universal processor 150 within the network 190.

Universal processor 150 may be configured to transmit back to the first user device 160 the code pattern 162 generated for the requested data transaction. The first user device 160 is configured to transmit the code pattern 162 to second user device 170 that is registered with the service processor 112a. In one embodiment, when first user device 160 and second user device 170 are collocated, first user device 160 may display the code pattern 162 received from the universal processor 150 on a display of the first user device 160. Second user device 170 may use a code scanner associated with the second user device 170 to scan the code pattern 162 off the display of the first user device 160. For example, when the second user device 170 is a smart phone, a camera device of the smart phone may be used to scan the code pattern off the display of the first user device 160. The second user device 170 may be configured to transmit the scanned code pattern 162 to the service processor 112a. As described above, second user device 170 may perform data transactions with service processors 112a-112d the second user device 170 is registered with using separate service applications 172 designed for managing data transactions with respective service processor 112a-112d. Second user device 170 may use the service application 172 corresponding to the service processor 112a requested for the data transaction to receive the code pattern 162 (e.g., scan the code pattern 162 off the display of the first user device 160) from the first user device 160 and/or transmit the code pattern 162 to service processor 112a. In one embodiment, the second user of the second user device 170 may need to login to the service application 172 using credentials associated with service account 114 of the second user at the service processor 112a, before the second user device 170 can receive the code pattern 162 and/or transmit the code pattern 162 to the service processor 112a using the service application 172. In an additional or alternative embodiment, second user device 170 may be configured to receive the code pattern 162 from the first user device 160 electronically via network 190.

The service processor 112a is configured to receive the code pattern 162 from the second user device 170 and decode the code pattern 162 to extract information included in the code pattern 162. Since the code pattern 162 was generated by the universal processor 150 using coding rules 152 defined for the service processor 112a, the service processor 112a can decode the code pattern 162 and extract the included information. For example, the information extracted by the service processor 112a from the decoded code pattern 162 may include account details relating to the host account 142 (e.g., account number, user details of the first user such as name, social security number etc.), a transaction identifier (ID) 154 for the requested data transaction, a network address of the universal processor 150 and an authorization for conducting the data transaction with the host account 142 at the host processor 140. The service processor 112a may be further configured to determine the service account 114 to be used for the requested data transaction. In one embodiment, service processor 112a may determine the service account 114 to be used for the data transaction based on the identity of the second user device 170 that transmitted the code pattern 162 to the service processor 112a. As described above, second user device 170 may be registered with the service processor 112a to perform data transactions associated with service account 114. The service processor 112a may obtain an identity of the second user device 170 and may look up the service account associated with second user device 170. In an additional or alternative embodiment, service processor 112a may determine the service account 114 based on user credentials used to login to the service application 172 at the second user device 170. As described above, the credentials used to login to the service application 172 may be associated with service account 114 of the second user at the service processor 112a. Thus, service processor 112a may determine the service account 114 associated with the user credentials used to login to the service application 172 at the second user device 170.

Service processor 112a may be configured to generate and transmit to the universal processor 150 at the network address included in the code pattern 162, a request to perform the data transaction. The request for the data transaction may include a transaction ID 154 of the requested data transaction also included in the code pattern 162.

Universal processor 150 may be configured to receive the request for the data transaction from the service processor 112a and lookup, based on the transaction ID 154 included in the request, information relating to the requested data transaction including one or more of the type of transaction (e.g., data transfer), host account details (e.g., host account number) and user data 144 that may be requested for a data transfer to the service processor 112a depending on the type of the data transaction. The universal processor 150 is configured to identify the host account 142 at the host processor 140 that is to be used for the data transaction. Based on the information related to the requested data transaction, the universal processor 150 may be configured to perform the data transaction using a pre-authorized secure connection between the universal processor 150 and service processor 112a. The type of the data transaction may include a transfer of user data 144 related to the host account 142 to the service account 114 or a transfer of user data 116 related to the service account 114 to host account 142.

When the requested data transaction is a transfer of user data 144 related to the host account 142 to the service account 114, universal processor 150 determines, based on looking up the information mapped to the transaction ID 154, the host account 142 and associated user data 144 requested for transfer to service account 114. The universal processor 150 transfers the user data 144 to the service processor 112a using a pre-authorized secure connection between the universal processor 150 and service processor 112a. Upon receiving the user data 144 from the universal processor 150, service processor 112a may forward the received user data 144 to the service account 114 to complete the data transaction.

When the requested data transaction is a transfer of user data 116 related to the service account 114 to the host account 142, universal processor 150 determines, based on looking up the information mapped to the transaction ID 154, the host account 142 to which user data 116 is to be directed to. The universal processor 150 may be configured to receive the user data 116 from the service processor using the pre-authorized secure connection between the universal processor 150 and service processor 112a. Universal processor 150 may forward the received user data 116 to the host account 142 to complete the data transaction. In one embodiment, universal processor 150 may send an indication to transmit the user data 116 to the service processor 112a after receiving the request for the data transaction from the service processor 112a. Service processor 112a may be configured to transmit user data 116 in response to receiving the indication from the universal processor.

In one or more embodiments, when the requested data transaction is successfully completed, service processor 112a may be configured to transmit an indication to the second user device 170 confirming that the data transaction has been successfully completed. Additionally or alternatively, the universal processor 150 may transmit an indication to the first user device 160 that the data transaction has been successfully completed.

Figure 2:
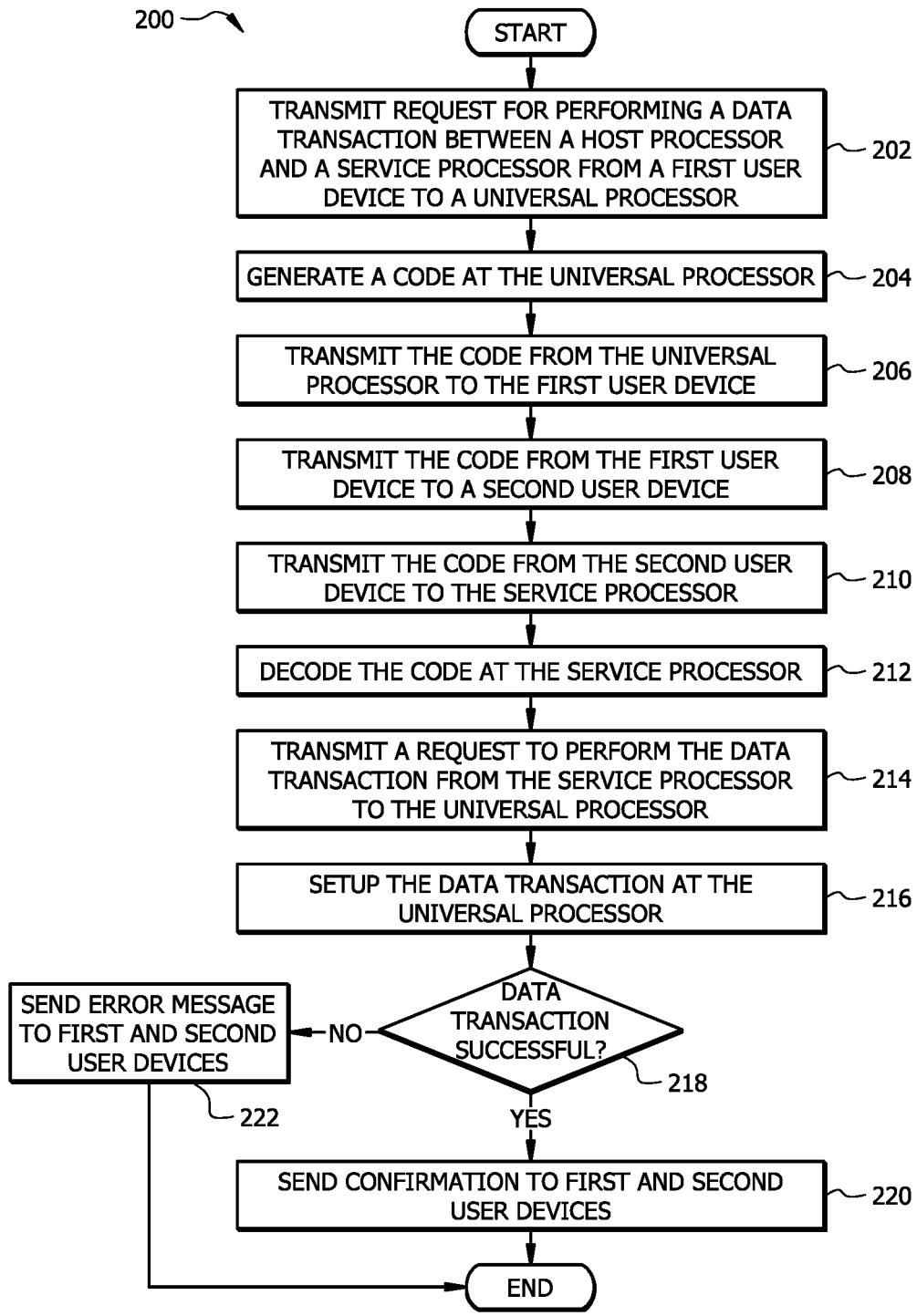
FIG. 2 is a flowchart of an example method for performing a data transaction between a host processor and a service processor, in accordance with certain embodiments of the present disclosure.

FIG. 2 is a flowchart of an example method 200 for performing a data transaction between a host processor and a service processor, in accordance with certain embodiments of the present disclosure. Method 200 may be performed by system 100 as shown in FIG. 1 and described above.

At step 202, a first user device (e.g., first user device 160) of a first user transmits a request for performing a data transaction between a host processor 140 and a service processor 112a to a universal processor 150.

As described above, host infrastructure 130 may include a host processor 140 and a universal processor 150 associated with the host processor 140. Host infrastructure 130 may be configured to provide one or more data processing services to users registered with the host infrastructure 130. For example, the first user may have a host account 142 with the host processor 140 which allows the first user to use certain data processing services provided by the host processor 140 using the first user device 160 of the first user. Host account 142 of the first user may be associated with user data 144 of the first user. User data 144 may include, but is not limited to, personal information related to the user (e.g., user name, social security number), user identification data including ID card number, driving license number, user biometrics data (e.g., fingerprints, face recognition pattern etc.), and information related to the host account 142 including account number and level of access. User data 144 may further include any other information or data maintained for the first user or by the first user at the host processor 140.

As described above, service infrastructure 110 may include a plurality of service processors 112a-112d. Each of the service processors 112a-112d may be configured to provide one or more data processing services to users registered with the service processor. For example, a second user may have a service account 114 with the service processor 112a which allows the second user to use certain data processing services provided by the service processor 112a using a second user device 170 of the second user. Service account 114 of the second user may be associated with user data 116 of the second user. User data 116 may include, but is not limited to, personal information related to the user (e.g., user name, social security number), user identification data including ID card number, driving license number, user biometrics data (e.g., fingerprints, face recognition pattern etc.), and information related to the service account 114 including account number and level of access. User data 116 may further include any other information or data maintained for the second user or by the second user at the service processor 112a.

Universal processor 150 of the host infrastructure 130 may be configured to bridge data transactions between the host processor 140 and each of the service processors 112a-112d of the service infrastructure 110. In one or more embodiments, universal processor 150 may be associated with the host processor such that universal processor 150 has access to host account 142, user data 144 and data processing services provided by the host processor 140. For example, universal processor 150 may be authorized by the host processor 140 to access host account 142 and corresponding user data 144, and further to perform data transactions on behalf of the host processor 140 with each of the service processors 112a-112d.

Universal processor 150 may be configured to establish a pre-authorized secure connection with each of the service processors 112a-112d that allows the universal processor 150 to access data processing services provided by the service processors 112a-112d. For example, universal processor 150 is preauthorized by service processor 112a to access service account 114, user data 116 and perform data transactions with the service processor 112a. Owing to the association with the host processor 140 and pre-authorized connections with service processors 112a-112d, universal processor 150 can freely perform data transactions between the host processor 140 and each service processor (e.g., 112a) without users of the host processor 140 (e.g., the first user) needing to register with the service processor 112a. For example, universal processor 150 may perform a data transfer between the host account 142 of the first user at the host processor 140 and the service account 114 of the second user at the service processor 112*a* without the first user registering with the service processor 112*a*.

First user device 160 may be registered as an authorized device with the host infrastructure 130. This allows first user device 160 to perform one or more data transactions with universal processor 150 and/or host processor 140. Similarly, second user device 170 may be registered as an authorized device with at least one of the service processors (e.g., 112*a*) allowing second user device 170 to perform one or more data transactions with the at least one service processor 112*a*. In one or more embodiments, a service application 172 may be installed and run on the second user device 170 that allows the second user to manage data transactions with the at least one service processor 112*a*. For example, when the second user device 170 is a smart phone, the service application 172 may include a mobile software application installed on the smart phone. In one embodiment, the service application 172 may be a dedicated application designed for managing data transactions with the service processor 112*a* implemented by a single service provider. This means when the second user desires to perform data transactions with multiple service processors 112*a*-112*d*, the second user may need to install separate dedicated service applications 172 for each of the multiple service processors 112*a*-112*d*. As described above, the second user may need to separately register with each of the service processors 112*a*-112*d* to access data services provided by each service processor. In one embodiment, second user device 170 may be linked to a specific service account 114 at a service processor 112*a* and can perform data transaction related to the service account 114.

Similarly, a host application 164 may be installed and run on first user device 160 that allows the first user device 160 to manage data transactions with the universal processor 150 and/or host processor 140. For example, when first user device 160 is a smart phone, the host application 164 may include a mobile software application installed on the smart phone. In one embodiment, first user device 160 may be linked to a specific host account 142 at the host processor and can perform data transactions related to the host account 142.

First user device 160 may be configured to initiate data transactions between the host processor 140 and each of the service processors 112*a*-112*d*. For example, first user device 160 may be configured to request the data transaction between the host account 142 of the first user at the host processor 140 and the service account 114 of the second user at the service processor 112*a*. The first user may initiate the request for the data transaction using the host application 164 installed on the first user device 160. In one embodiment, the host application 164 may present a choice of performing the data transaction using multiple service processors 112*a*-112*d*. The first user may select any one of the service processors 112*a*-112*d* to perform the data transaction with the host processor 140. The first user may further specify a nature of the data transaction and other details related to the data transaction using the host application 164. For example, the data transaction may include a transfer of user data 144 related to the host account 142 to the service account 114 or a transfer of user data 116 related to the service account 114 to the host account 142. In this case, the first user may specify details relating to the user data 144 or user data 116 (whichever the case may be) for the data transfer. In response to receiving a selection of a service processor 112*a* via the host application 164, first user device 160 may generate and transmit a request to the universal processor 150 for the data transaction between host account 142 at the host processor 140 and service account 114 at the service processor 112*a*. The request may include the details of the data transaction as specified by the user. For example, the details of the data transaction included in the request may include a request for transfer of user data 144 from the host account 142 to service account 114 or transfer of user data 116 from the service account 114 to host account 142. The request may include an identity of the service processor 112*a* selected by the user for the data transaction.

At step 204, in response to receiving the request for performing the data transaction from the first user device 160, universal processor 150 generates a code (e.g., code pattern 162) that can be interpreted by the service processor 112*a*.

In response to receiving the request for the data transaction from first user device 160, universal processor 150 may generate the code pattern 162 for the data transaction in accordance with coding rules 152 defined for the service processor 112*a* that was selected for the data transaction. The universal processor 150 may extract the identity of the service processor 112*a* from the request and select the coding rules 152 corresponding to the service processor 112*a* for generation of the code pattern 162. Generating the code pattern 162 according to coding rules 152 defined for the service processor 112*a* allows the service processor 112*a* to decode and interpret the code pattern 162. Universal processor 150 may include information in the code pattern 162 that may be needed by the service processor 112*a* to conduct the requested data transaction with the host processor 140 using the universal processor 150. For example, information included in the code pattern 162 may include, but is not limited to, account details relating to the host account 142 (e.g., account number, user details such as name, social security number etc.), a transaction ID 154 for the requested data transaction, a network address of the universal processor 150 and an authorization for conducting the data transaction with the host account 142 at the host processor 140. Universal processor 150 may be configured to assign a unique transaction ID 154 to every data transaction conducted using the universal processor 150. The transaction ID 154 may be associated with information relating to the data transaction. For example, universal processor 150 may generate a unique transaction ID 154 for the data transaction requested by the first user device 160 and map the transaction ID 154 to information relating to the data transaction including one or more of the type of transaction (e.g., data transfer), host account details (e.g., host account number) and user data 144 that is requested for a data transfer to the service processor 112*a*. The network address of the universal processor 150 may include an Internet Protocol (IP) address, Media Access Control (MAC) address or any other address that uniquely identifies the universal processor 150 and allows other devices connected to the network 190 to find the universal processor 150 within the network 190.

At step 206, universal processor 150 transmits back to the first user device 160 the code pattern 162 generated for the requested data transaction.

At step 208, the first user device 160 transmits the code pattern 162 to second user device 170 which is registered with the service processor 112*a*. In one embodiment, when first user device 160 and second user device 170 are collocated, first user device 160 may display the code pattern 162 received from the universal processor 150 on a display of the first user device 160. Second user device 170 may use a code scanner associated with the second user device 170 to scan the code pattern 162 off the display of the first user device 160. For example, when the second user device 170 is a smart phone, a camera device of the smart phone may be used to scan the code pattern 162 off the display of the first user device 160.

At step 210, the second user device 170 transmits the scanned code pattern 162 to the service processor 112a. As described above, second user device 170 may perform data transactions with service processors 112a-112d the second user device 170 is registered with using separate service applications 172 designed for managing data transactions with respective service processor 112a-112d. Second user device 170 may use the service application 172 corresponding to the service processor 112a requested for the data transaction to receive the code pattern 162 (e.g., scan the code pattern 162 off the display of the first user device 160) from the first user device 160 and/or transmit the code pattern 162 to service processor 112a. In one embodiment, the second user of the second user device 170 may need to login to the service application 172 using credentials associated with service account 114 of the second user at the service processor 112a, before the second user device 170 can receive the code pattern 162 and/or transmit the code pattern 162 to the service processor 112a using the service application 172. In an additional or alternative embodiment, second user device 170 may be configured to receive the code pattern 162 from the first user device 160 electronically via network 190.

At step 212, service processor 112a is configured to receive the code pattern 162 from the second user device 170 and decode the code pattern 162 to extract information included in the code pattern 162. Since the code pattern 162 was generated by the universal processor 150 using coding rules 152 defined for the service processor 112a, the service processor 112a can decode the code pattern 162 and extract the included information. For example, the information extracted by the service processor 112a from the code pattern 162 may include account details relating to the host account 142 (e.g., account number, user details such as name, social security number etc.), a transaction ID 154 for the requested data transaction, a network address of the universal processor 150 and an authorization for conducting the data transaction with the host account 142 at the host processor 140. The service processor 112a may be further configured to determine the service account 114 to be used for the requested data transaction. In one embodiment, service processor 112a may determine the service account 114 to be used for the data transaction based on the identity of the second user device 170 that transmitted the code pattern 162 to the service processor 112a. As described above, second user device 170 may be registered with the service processor to perform data transactions associated with service account 114. The service processor 112a may obtain an identity of the second user device 170 and may look up the service account 114 associated with second user device 170. In an additional or alternative embodiment, service processor 112a may determine the service account 114 based on user credentials used to login to the service application 172 at the second user device 170. As described above, the credentials used to login to the service application 172 may be associated with service account 114 of the second user at the service processor 112a. Thus, service processor 112a may determine the service account 114 associated with the user credentials used to login to the service application 172 at the second user device 170.

At step 214, service processor 112a may generate and transmit to the universal processor 150 at the network address included in the code pattern 162, a request to perform the data transaction. The request for the data transaction may include a transaction ID 154 of the requested data transaction also included in the code pattern 162.

At step 216, the universal processor 150 may setup the requested data transaction based on the request received from the service processor 112a.

Universal processor 150 may receive the request for the data transaction from the service processor 112a and lookup, based on the transaction ID 154 included in the request, information relating to the requested data transaction including one or more of the type of transaction (e.g., data transfer), host account details (e.g., host account number) and user data 144 that may be requested for a data transfer to the service processor 112a depending on the type of the data transaction. The universal processor 150 is configured to identify the host account 142 at the host processor 140 that is to be used for the data transaction. Based on the information related to the requested data transaction, the universal processor 150 may be configured to perform the data transaction using a pre-authorized secure connection between the universal processor 150 and service processor 112a. The type of the data transaction may include a transfer of user data 144 related to the host account 142 to the service account 114 or a transfer of user data 116 related to the service account 114 to host account 142.

When the requested data transaction is a transfer of user data 144 related to the host account 142 to the service account 114, universal processor 150 determines, based on looking up the information mapped to the transaction ID 154, the host account 142 and associated user data 144 requested for transfer to service account 114. The universal processor 150 obtains and transfers the user data 144 to the service processor 112a using a pre-authorized secure connection between the universal processor 150 and service processor 112a. Upon receiving the user data 144 from the universal processor 150, service processor 112a may forward the received user data 144 to the service account 114 to complete the data transaction.

When the requested data transaction is a transfer of user data 116 related to the service account 114 to the host account 142, universal processor 150 determines, based on looking up the information mapped to the transaction ID 154, the host account 142 to which user data 116 is to be directed to. The universal processor 150 may be configured to receive the user data 116 from the service processor 112a using the pre-authorized secure connection between the universal processor 150 and service processor 112a. Universal processor 150 may forward the received user data 116 to the host account 142 to complete the data transaction. In one embodiment, universal processor 150 may send an indication to transmit the user data 116 to the service processor 112a after receiving the request for the data transaction from the service processor 112a. Service processor 112a may be configured to transmit user data 116 in response to receiving the indication from the universal processor.

At step 218, universal processor 150 and/or service processor 112a may determine whether the data transaction was successfully completed. For example, when the data transaction includes a data transfer between the service processor 112a and the host processor 140, the data transaction is determined as successfully completed when data was successfully transferred between the service processor 112a and host processor 140. If the data transaction is determined as successfully completed, method 200 proceeds to step 220, where service processor 112a may transmit an indication to the second user device 170 confirming that the data transaction has been successfully completed. Additionally or alternatively, the universal processor 150 may transmit an indication to the first user device 160 that the data transaction has been successfully completed.

However, when the data transaction is determined as not successfully completed, method 200 proceeds to step 222 where service processor 112a and universal processor 150 send out error messages to respective second user device 170 and first user device 160.

In one example use case, the host infrastructure 130 may be implemented by a banking corporation and each of the service processors 112a-112d may be implemented by separate payment service providers. In this case, the host processor 140 may include a banking server that maintains user bank accounts. The host account 142 may be representative of a bank account held by the first user and user data 144 may be representative of funds maintained in the bank account. Each of the service processors 112a-112d may be representative of a payment processing server of a different payment service provider. Each payment service provider may register users and may allow users registered with the payment service provider to transfer funds between user accounts maintained at the payment service provider. Service account 114 at service processor 112a may be representative of an account maintained by the second user at the respective payment service provider. User data 116 may be representative of funds maintained in the service account 114. The payment service providers may not allow users that are not registered with the service provider to exchange funds with registered users of the service provider. Universal processor 150 may be representative of a universal bank payment system/application that allows a user having a bank account (e.g. host account 142) with the banking corporation to exchange funds with user accounts (e.g., service account 114) held at any one of the payment service providers, without the user of the host account 142 needing to register with the service providers. For example, first user of the host account 142 may exchange funds with the service account 114 of the second user, in accordance with methods described above.

Figure 3:
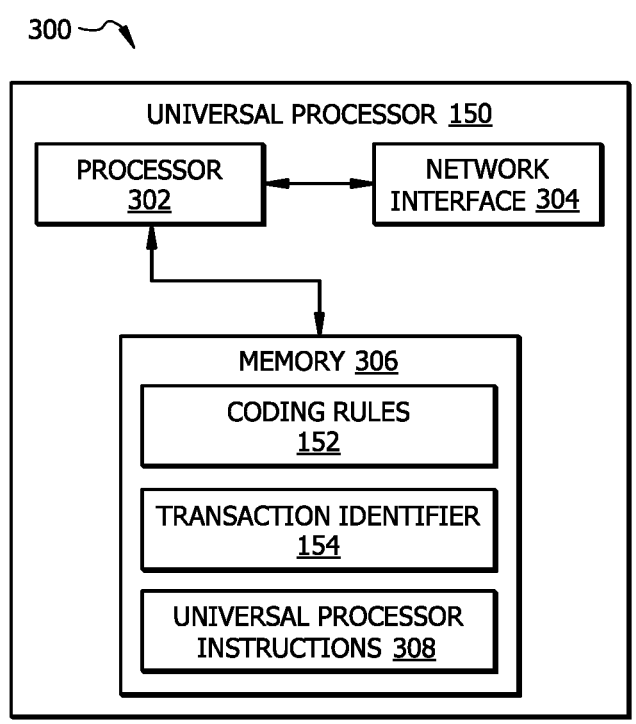
FIG. 3 illustrates an example schematic diagram of the universal processor illustrated in FIG. 1, in accordance with one or more embodiments of the present disclosure.

FIG. 3 illustrates an example schematic diagram of the universal processor 150 illustrated in FIG. 1, in accordance with one or more embodiments of the present disclosure.

Universal processor 150 includes a processor 302, a memory 306, and a network interface 304. The universal processor 150 may be configured as shown in FIG. 3 or in any other suitable configuration.

The processor 302 comprises one or more processors operably coupled to the memory 306. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 306. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., universal processor instructions 308) to implement the universal processor 150. In this way, processor 302 may be a special-purpose computer designed to implement the functions disclosed herein. In one or more embodiments, the universal processor 150 is implemented using logic units, FPGAs, ASICs, DSPs, or any other suitable hardware. The universal processor 150 is configured to operate as described with reference to FIGS. 1-2. For example, the universal processor 150 may be configured to perform at least a portion of the method 200 as described in FIG. 2.

The memory 306 comprises one or more disks, tape drives, or solid-state drives, and may be used as an over-flow data storage device, to store programs when such programs are selected for execution, and to store instructions and data that are read during program execution. The memory 306 may be volatile or non-volatile and may comprise a read-only memory (ROM), random-access memory (RAM), ternary content-addressable memory (TCAM), dynamic random-access memory (DRAM), and static random-access memory (SRAM).

The memory 306 is operable to store coding rules 152, transaction ID 154 and universal processor instructions 308. The universal processor instructions 308 may include any suitable set of instructions, logic, rules, or code operable to execute the universal processor 150.

The network interface 304 is configured to enable wired and/or wireless communications. The network interface 304 is configured to communicate data between the universal processor 150 and other devices, systems, or domains (e.g. one or more service processors 112a-112d, host processor 140, first user device 160, second user device 170 etc.). For example, the network interface 304 may comprise a Wi-Fi interface, a LAN interface, a WAN interface, a modem, a switch, or a router. The processor 302 is configured to send and receive data using the network interface 304. The network interface 304 may be configured to use any suitable type of communication protocol as would be appreciated by one of ordinary skill in the art.

It may be noted that each of the service processors 112a-112d, host processor 140, first user device 160 and second user device 170 may be implemented similar to the universal processor 150. For example, the each of the service processors 112a-112d, host processor 140, first user device 160 and second user device 170 may include a processor and a memory storing instructions to implement the respective functionality as described above when executed by the processor. The memory of each service processor 112a-112d may further store service account 114, and user data 116. The memory of the host processor 140 may further store host account 142 and user data 144. The memory of the first user device 160 may further store host application 164. The memory of the second user device 170 may further store service application 172.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a host processor registering a first user;
a plurality of service processors;
a universal processor associated with the host processor and capable of exchanging data with each of the service processors, wherein the universal processor bridges data transactions between the host processor and each of the service processors, wherein:
the universal processor establishes a pre-authorized secure connection with one or more of the service processors; and
the universal processor authorizes the pre-authorized secure connection with a particular service processor when the particular service processor satisfies a minimum threshold security standard;
a first user device of the first user communicatively coupled to the universal processor, wherein the first user is registered with the host processor and has a first user account stored at the host processor that allows the first user to use data processing services provided by the host processor using the first user device of the first user;
a second user device of a second user communicatively coupled to at least one service processor of the plurality of service processors, wherein the second user is registered with the at least one service processor and has a second user account with the at least one service processor that allows the second user to use data processing services provided by the at least one service processor using the second user device of the second user, wherein the host processor and the at least one service processor are implemented by different service providers;
wherein the universal processor is configured to:
receive from the first user device a request for performing a data transaction between the host processor and the at least one service processor, wherein the data transaction comprises a data transfer between the first user account at the host processor and the second user account at the at least one service processor;
generate a code that can be interpreted only by the at least one service processor, wherein:
the code is generated according to at least one rule set by the at least one service processor;
the at least one rule is unique for the at least one service processor and is different from at least one second rule set by a second service processor;
the code comprises information needed by the at least one service processor to perform the data transaction between at least one service processor and the host processor; and
the information at least comprises an identity of the first user account, an identity of the second user account, a transaction identifier for the data transaction, and a network address of the universal processor; and
transmit the code to the first user device;
wherein the first user device is configured to transmit the code to the second user device;
wherein the second user device is configured to transmit the code to the at least one service processor;
wherein the at least one service processor is configured to:
receive the code from the second user device;
decode the code to extract the information included in the code;
transmit to the universal processor a request to perform the data transaction with the host processor based on the extracted information from the code, wherein transmitting the request to the universal processor comprises transmitting the request to the universal processor at the network address of the universal processor extracted from the code; and
perform the data transaction with the host processor using the universal processor;
wherein the universal processor is further configured to:
receive the request from the at least one service processor; and
in response, set up the data transaction between the host processor and the at least one service processor, wherein setting up the data transaction comprises performing the data transfer between the first user account at the host processor and the second user account at the at least one service processor using the pre-authorized secure connection between the universal processor and the at least one service processor.

2. The system of claim 1, wherein the code includes information relating to one or more of an identity of the universal processor, wherein the transaction identifier is associated with the first user account of the first user at the host processor.

3. The system of claim 2, wherein:
the information extracted from the code by the at least one service processor includes the identity of the universal processor and the transaction identifier of the data transaction;
the at least one service processor is further configured to:
determine a network address of the universal processor based on the identity of the universal processor; and
forward to the network address of the universal processor the request to perform the data transaction with the host processor, wherein the request comprises the transaction identifier of the data transaction;
the universal processor is further configured to:
extract the transaction identifier of the data transaction from the request;

determine based on the transaction identifier the first user account of the first user at the host processor; and setup the data transaction between the first user account at the host processor and the at least one service processor.

4. The system of claim 2, wherein the data transaction comprises a transfer of data from the first user account of the first user at the host processor to the second user account of the second user at the at least one service processor.

5. The system of claim 4, wherein:
the at least one service processor is further configured to:
identify the second user account of the second user at the at least one service processor;
determine a network address of the universal processor based on the identity of the universal processor;
forward to the universal processor at the determined network address the request for the data transfer from the host processor, wherein the request comprises the transaction identifier of the data transaction;
in response, receive from the universal processor the data transfer from the first user account at the host processor;
forward the data transfer to the second user account;
the universal processor is further configured to:
extract the transaction identifier of the data transaction from the request;
determine based on the transaction identifier the first user account of the first user at the host processor; and
perform the transfer of the data from the first user account at the host processor to the at least one service processor.

6. The system of claim 2, wherein the data transaction comprises a transfer of data into the first user account of the first user at the host processor from the second user account of the second user at the at least one service processor.

7. The system of claim 6, wherein:
the at least one service processor is further configured to:
identify the second user account of the second user at the at least one service processor;
determine a network address of the universal processor based on the identity of the universal processor;
forward to the network address of the universal processor the request to perform the data transfer to the host processor, wherein the request comprises the transaction identifier of the data transaction;
in response, transfer the data from the second user account to the universal processor;
the universal processor is further configured to:
extract the transaction identifier of the data transaction from the request;
determine based on the transaction identifier the first user account of the first user at the host processor;
receive the transfer of data from the at least one service processor; and
forward the received data to the first user account at the host processor.

8. The system of claim 1, wherein:
the host processor comprises a host application; and
the universal processor includes a plugin application of the host application.

9. The system of claim 1, wherein the code comprises a Quick Response (QR) code.

10. A system for implementing a data transaction, comprising:
at least one processor configured to:
receive from a first user device of a first user a request for performing the data transaction between a host processor and at least one service processor of a plurality of service processors, wherein:
the first user is registered with the host processor and has a first user account stored at the host processor that allows the first user to use data processing services provided by the host processor using the first user device of the first user, wherein the host processor and the at least one service processor are implemented by different service providers; and
the data transaction comprises a data transfer between the first user account at the host processor and a second user account at the at least one service processor;
a universal processor is associated with the host processor and capable of exchanging data with each of the plurality of service processors, wherein
the universal processor establishes a pre-authorized secure connection with one or more of the service processors; and
the universal processor authorizes the pre-authorized secure connection with a particular service processor when the particular service processor satisfies a minimum threshold security standard; and
the universal processor bridges data transactions between the host processor and each of the service processors and is communicatively coupled to the first user device of the first user;
generate a code that can be interpreted only by the at least one service processor, wherein;
the code is generated according to at least one rule set by the at least one service processor;
the at least one rule is unique for the at least one service processor and is different from at least one second rule set by a second service processor;
the code comprises information needed by the at least one service processor to perform the data transaction between at least one service processor and the host processor; and
the information at least comprises an identity of the first user account, an identity of the second user account, a transaction identifier for the data transaction, and a network address of the universal processor;
transmit the code to the first user device for forwarding to the at least one service processor via a second user device of a second user, wherein the second user is registered with the at least one service processor and has the second user account with the at least one service processor that allows the second user to use data processing services provided by the at least one service processor using the second user device of the second user;
receive a request from the at least one service processor to perform the data transaction with the host processor based on the code; and
in response, set up the data transaction between the host processor and the at least one service processor, wherein setting up the data transaction comprises performing the data transfer between the first user account at the host processor and the second user account at the at least one service processor using the pre-authorized secure connection between the universal processor and the at least one service processor;
a memory coupled to the at least one processor and configured to store the at least one rule set by the at least one service processor.

11. The system of claim 10, wherein the code includes information relating to one or more of an identity of the universal processor, wherein the transaction identifier is associated with the first user account of the first user at the host processor.

12. The system of claim 11, wherein:
the data transaction comprises a transfer of data from the first user account of the first user at the host processor to the second user account of a second user at the at least one service processor;
the at least one processor is further configured to:
receive from the at least one service processor the request for the data transfer from the host processor, wherein the request comprises the transaction identifier of the data transaction;
extract the transaction identifier of the data transaction from the request;
determine based on the transaction identifier the first user account of the first user at the host processor; and
perform the transfer of the data from the first user account at the host processor to the at least one service processor.

13. The system of claim 11, wherein:
the data transaction comprises a transfer of data into the first user account of the first user at the host processor from a second user account of a second user at the at least one service processor;
the at least one processor is further configured to:
receive the request to perform the data transfer to the host processor, wherein the request comprises the transaction identifier of the data transaction;
extract the transaction identifier of the data transaction from the request;
determine based on the transaction identifier the first user account of the first user at the host processor;
receive the transfer of data from the at least one service processor; and
forward the received data to the first user account at the host processor.

14. A method, comprising:
receiving from a first user device of a first user a request for performing a data transaction between a host processor and at least one service processor of a plurality of service processors, wherein:
the first user is registered with the host processor and has a first user account stored at the host processor that allows the first user to use data processing services provided by the host processor using the first user device of the first user, wherein the host processor and the at least one service processor are implemented by different service providers; and
the data transaction comprises a data transfer between the first user account at the host processor and a second user account at the at least one service processor;
a universal processor is associated with the host processor and capable of exchanging data with each of the plurality of service processors, wherein the universal processor establishes a pre-authorized secure connection with one or more of the service processors; and
the universal processor authorizes the pre-authorized secure connection with a particular service processor when the particular service processor satisfies a minimum threshold security standard; and
the universal processor bridges data transactions between the host processor and each of the service processors and is communicatively coupled to the first user device of the first user;
generating a code that can be interpreted only by the at least one service processor, wherein:
the code is generated according to at least one rule set by the at least one service processor;
the at least one rule is unique for the at least one service processor and is different from at least one second rule set by a second service processor;
the code comprises information needed by the at least one service processor to perform the data transaction between at least one service processor and the host processor; and
the information at least comprises an identity of the first user account, an identity of the second user account, a transaction identifier for the data transaction, and a network address of the universal processor;
transmitting the code to the first user device for forwarding to the at least one service processor via a second user device of a second user, wherein the second user is registered with the at least one service processor and has the second user account with the at least one service processor that allows the second user to use data processing services provided by the at least one service processor using the second user device of the second user;
receiving a request from the at least one service processor to perform the data transaction with the host processor based on the code; and
in response, setting up the data transaction between the host processor and the at least one service processor, wherein setting up the data transaction comprises performing the data transfer between the first user account at the host processor and the second user account at the at least one service processor using the pre-authorized secure connection between the universal processor and the at least one service processor.

15. The method of claim 14, wherein the code includes information relating to one or more of an identity of the universal processor, wherein the transaction identifier is associated with the first user account of the first user at the host processor.

16. The method of claim 15, wherein:
the data transaction comprises a transfer of data from the first user account of the first user at the host processor to the second user account of a second user at the at least one service processor;
further comprising:
receiving from the at least one service processor the request for the data transfer from the host processor, wherein the request comprises the transaction identifier of the data transaction;
extracting the transaction identifier of the data transaction from the request;
determining based on the transaction identifier the first user account of the first user at the host processor; and performing the transfer of the data from the first user account at the host processor to the at least one service processor.

17. The method of claim 15, wherein:

the data transaction comprises a transfer of data into the first user account of the first user at the host processor from a second user account of a second user at the at least one service processor;

further comprising:

receiving the request to perform the data transfer to the host processor, wherein the request comprises the transaction identifier of the data transaction;

extracting the transaction identifier of the data transaction from the request;

determining based on the transaction identifier the first user account of the first user at the host processor;

receiving the transfer of data from the at least one service processor; and forward the received data to the first user account at the host processor.

* * * * *